United States Patent Office 3,116,160
Patented Dec. 31, 1963

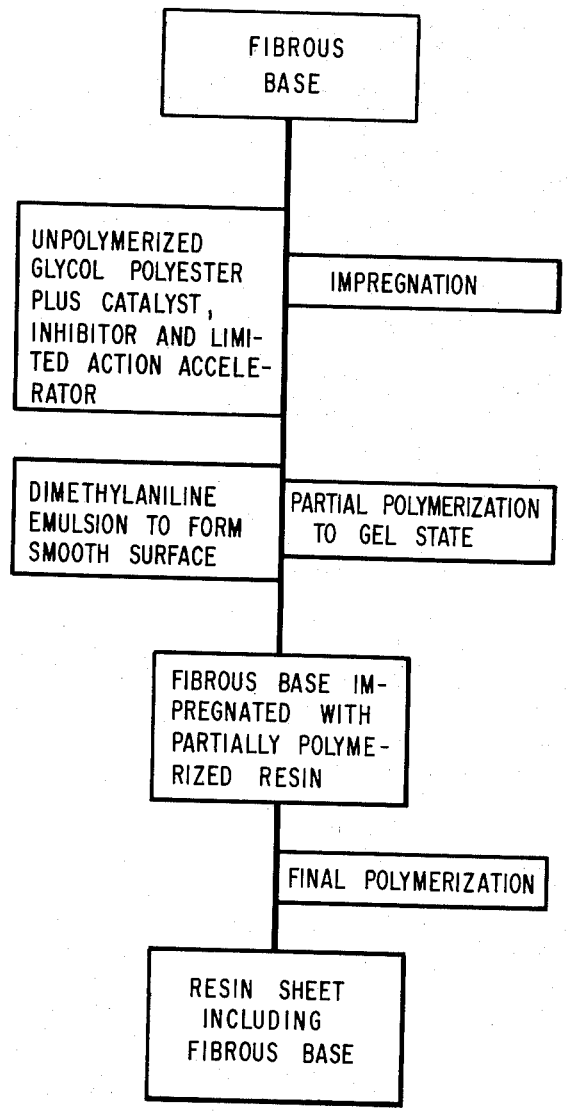

3,116,160
PARTIALLY POLYMERIZED UNSATURATED POLYESTER COATING ON A FIBROUS BASE
Pierre Paul William Varlet, Asnieres, France, assignor to Societe Anonyme des Usines Chausson, Asnieres, France, a company of France
Filed Nov. 27, 1961, Ser. No. 155,207
Claims priority, application France Dec. 5, 1960
4 Claims. (Cl. 117—62.2)

Processes have already been described for making sheets, plates or similar objects reinforced with synthetic resin, intended to be used in multiple applications and able to be shaped by stamping or some other manner by using work means similar to those put into operation for shaping steel plates or sheets currently used in numerous industries.

Means have more particularly been described which consist of making the work easier on plates or sheets of incompletely polymerized polyester resins of glycol by making the surface of the latter relatively slippery by the addition of special waxes. In particular, it has been shown that the resins were brought to a semi-polymerized state defined as a jelly stage, where the resins are already partly polymerized, but retain sufficient suppleness for shaping. Moreover, in this jelly state, the resins, to which polymerization inhibitors are added, remain stable for a very long time, in the order of several weeks and this, at the ambient temperature, thus enabling the manufactured plates or sheets to be stored.

The hardness of the polyester resin jelly of the manufactured plates or sheets can be regulated so that this jelly has a predetermined consistency making these plates or sheets more apt to be used in the particular applications to which said sheets or plates are destined. This regulating of the hardness of the jelly is obtained more particularly by the combined action on the basic resins, namely, non-saturated polyester resins, of a metallic reducing salt, generally stannous or zinc chloride, and an agent for modifying the action of this salt, this agent being able to be formed from furan derivatives, formamide, dioxan or else furfurol, used either alone, or in combination and eventually also, this having frequently been found advantageous, in the presence of ethylene glycol and its derivatives.

The present invention seeks still further to improve the manufacturing process of plates or sheets of polyester resins in jelly state, this improvement essentially consisting of giving a simple but efficacious surface treatment to the resin sheets or plates brought to the jelly state, so that the surface of these plates or sheets is smooth and not sticky.

According to the invention, an emulsion is prepared of an aqueous emulsion with a low dimethylaniline concentration, to which is added a moistening product for facilitating the moistening of the sheets or plates of resin, which are to be brought to the jelly state and receive surface treatment, by putting them into said emulsion heated to a temperature of about 70° C.

The drawing represents a flow diagram of the inventive process.

Various other characteristics of the invention will moreover be revealed by the detailed description which follows.

In the first place, in the known manner, impregnation polyester resins are prepared which can be obtained by baking 5 molecules of ethylene glycol with 2.5 molecules of maleic anhydride, 2.5 molecules of adipic acid and 2 molecules of phthalic anhydride, of which 100 parts are added to about 35 parts of methylstyrene. The supports are then prepared which are to be impregnated by these resins. These supports, made of fabrics, paper, fibres, are coated with catalyzed resins, i.e., resins to which a polymerization catalyst has been added which is to be brought to react only when complete polymerization of the sheets or plates is desired, i.e., a time that may be relatively long after reaching the jelly state. Such polymerization catalysts are well known and benzoyl-peroxide can more particularly be used. Moreover, the resin, when it is made to impregnate the support, can contain a polymerization inhibitor, formed, for example, by a solution of 4-methyl-2-6-butyl-ditertiary-phenol (trademark, Topanol) or else by a solution containing 6 grams of Topanol and 100 grams of styrene. The limited action polymerization accelerator is intended to allow the passage of the resin into the jelly stage. It can, as has already been described, be either incorporated in the resin, or used for a pre-impregnation of the support. This product has both an accelerating and a moderating action on polymerization, can be a solution containing 1 gram of stannous chloride $SnCl_2$ in 4 cm.³ of dimethyl-formamide or else a solution of stannous chloride in dioxan, according as to whether more or less hardness is required.

Of course, the polyester need not necessarily be pure, but can, on the contrary, contain a filler such as $CaCO_3$. When the support is impregnated with resin, containing the various constituents described above, or put into their presence, this resin must be jellified, then have surface treatment so that the surface is smooth, without wrinkles and is not sticky, so that it will not be necessary to store the manufactured plates between insulating strips. Moreover, for starting polymerization reaction leading to the jelly state, it is necessary to subject the supports impregnated with resin to heat treatment, this action requiring to be carefully controlled with regard to time and carried out in a perfectly constant manner.

For surface treatment of the jelly which must be obtained simultaneously with the carrying out of the surface treatment process, an aqueous emulsion is prepared advantageously containing for 1000 cm.³ of water, 0.06 cm.³ of dimethylaniline and 0.06 cm.³ of an additive known under the name of "Noramox S–11" which is a condensation product of ethylene oxide on amines of the formula:

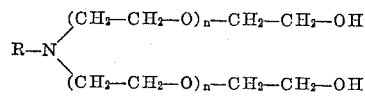

This emulsion is brought to a temperature of about 70° C. and the sheets or plates of resin are plunged into the emulsion and allowed to stay there during a sufficient time for starting the process leading to the jelly stage. This prejellification reaction is generally effected in a time of 1 to 2 minutes which can obviously be modified by varying the temperature of the emulsion. The presence of dimethylaniline in the emulsion has the effect that a surface polymerization is started in a more pronounced manner than in the heart of the sheets or plates and this dimethylaniline thus causes the formation of an extremely thin smooth skin. On leaving the emulsion bath, the treated sheets or plates are made to pass into a drying oven then they can be directly stored one on top of the other.

As can be seen from the foregoing, the surface treatment and prejellification reaction are carried out simultaneously by extremely simple and very cheap means, which is a considerable advantage.

I claim:
1. Process for the preparation of partially polymerized sheets of unsaturated polyester resin on an impregnated support, said sheets having a smooth and nonadherent surface, which comprises the steps of impregnating a fibrous base with a mixture of unpolymerized non-saturated glycol polyester, a polymerization catalyst therefor, a polymerization inhibitor, and a limited action polymerization accelerator, partially polymerizing said resin to a gel state and simultaneously effecting formation of a smooth thin surface on said resin, by immersing the impregnated fibrous base in an aqueous emulsion of dimethylaniline and a wetting agent consisting essentially of a condensation product of ethylene oxide and an amine, at a temperature of about 70° C. for a period of from about one to about two minutes.

2. The process of claim 1 in which the aqueous emulsion consists essentially of the said ingredients in the proportion of 100 cc. water, 0.06 cc. dimethylaniline, and 0.06 cc. of said condensation product.

3. The process of claim 1 in which the polyester resin is a condensation product of ethylene glycol, maleic anhydride, adipic acid and phthalic anhydride.

4. The process of claim 1 in which the limited action polymerization accelerator is a solution of stannous chloride in a solvent selected from the group consisting of dimethyl formamide, dioxan and furan.

References Cited in the file of this patent

UNITED STATES PATENTS

| | | |
|---|---|---|
| 2,740,764 | Nischk et al. | Apr. 3, 1956 |
| 2,813,751 | Barrett | Nov. 19, 1957 |